(12) United States Patent
Knacke et al.

(10) Patent No.: US 8,596,584 B2
(45) Date of Patent: Dec. 3, 2013

(54) HIGH-LIFT SYSTEM FOR AN AIRCRAFT WITH A MAIN WING AND AN ADJUSTABLE SLAT

(75) Inventors: Thilo Knacke, Berlin (DE); Frank Thiele, Berlin (DE)

(73) Assignee: Airbus Operations GmbH, Hamburg (DE)

( * ) Notice: Subject to any disclaimer, the term of this patent is extended or adjusted under 35 U.S.C. 154(b) by 807 days.

(21) Appl. No.: 12/808,959

(22) PCT Filed: Dec. 22, 2008

(86) PCT No.: PCT/EP2008/011042
§ 371 (c)(1),
(2), (4) Date: Jun. 17, 2010

(87) PCT Pub. No.: WO2009/080355
PCT Pub. Date: Jul. 2, 2009

(65) Prior Publication Data
US 2010/0258679 A1 Oct. 14, 2010

Related U.S. Application Data

(60) Provisional application No. 61/015,217, filed on Dec. 20, 2007.

(30) Foreign Application Priority Data

Dec. 20, 2007 (DE) .......................... 10 2007 061 590

(51) Int. Cl.
*B64C 9/24* (2006.01)
*B64C 21/06* (2006.01)

(52) U.S. Cl.
USPC .......................................... 244/214; 244/209

(58) Field of Classification Search
USPC ...... 244/214, 34 R, 35 R, 198, 201, 213, 210, 244/207, 209
See application file for complete search history.

(56) References Cited

U.S. PATENT DOCUMENTS 3,363,859 A 1/1968 Watts
3,720,388 A * 3/1973 Kaatz et al. ............... 244/134 A
(Continued)

FOREIGN PATENT DOCUMENTS

CN 1184056 A 6/1998
DE 746714 C 12/1944
(Continued)

OTHER PUBLICATIONS

Office Action for corresponding Chinese Application No. 200880122529.3, dated Sep., 26, 2012.
(Continued)

*Primary Examiner* — Joseph W Sanderson
*Assistant Examiner* — Marc Burgess
(74) *Attorney, Agent, or Firm* — Ingrassia Fisher & Lorenz P.C.

(57) ABSTRACT

A high-lift system for an aircraft with a main wing and a slat that by way of an adjustment device is adjustable relative to the main wing to various adjustment states, with a gap resulting between the rear of the slat, which rear faces the main wing, and the main wing, where the size of the gap results from the adjustment state of the slat relative to the main wing, where in the interior of the slat an air guidance channel with at least one inlet and an outlet is formed, where the inlet is arranged at the rear, which faces the main wing, in order to influence the airflow in the gap.

35 Claims, 2 Drawing Sheets

(56) References Cited

U.S. PATENT DOCUMENTS

| | | | |
|---|---|---|---|
| 3,917,193 A | 11/1975 | Runnels, Jr. | |
| 4,285,482 A | 8/1981 | Lewis | |
| 4,752,049 A | 6/1988 | Cole | |
| 5,899,416 A * | 5/1999 | Meister et al. | 244/207 |
| 6,283,411 B1 * | 9/2001 | Giamati et al. | 244/134 A |
| 6,394,396 B2 * | 5/2002 | Gleine et al. | 244/198 |
| 6,457,680 B1 | 10/2002 | Dobrzynski et al. | |
| 6,789,769 B2 | 9/2004 | Mau et al. | |
| 7,114,519 B2 * | 10/2006 | Aitchison et al. | 137/518 |
| 2001/0038058 A1 | 11/2001 | Gleine et al. | |
| 2003/0226936 A1 | 12/2003 | Mau et al. | |
| 2004/0155157 A1* | 8/2004 | Bray | 244/198 |
| 2006/0038088 A1* | 2/2006 | Dodson | 244/214 |
| 2007/0034746 A1 | 2/2007 | Shmilovich | |
| 2007/0241236 A1* | 10/2007 | Whitehouse et al. | 244/214 |
| 2008/0251647 A1 | 10/2008 | Grohmann | |

FOREIGN PATENT DOCUMENTS

| | | |
|---|---|---|
| DE | 19925560 A1 | 12/2000 |
| DE | 10019185 A1 | 10/2001 |
| DE | 10157849 A1 | 6/2003 |
| DE | 102004056537 A1 | 6/2006 |
| EP | 0230684 A | 8/1987 |

OTHER PUBLICATIONS

International Search Report for corresponding PCT application PCT/EP08/011042, dated Jul. 22, 2009.

International Preliminary Report on Patentability for corresponding PCT application PCT/EP08/011042, dated Aug. 3, 2010.

* cited by examiner

HIGH-LIFT SYSTEM FOR AN AIRCRAFT WITH A MAIN WING AND AN ADJUSTABLE SLAT

CROSS REFERENCE TO RELATED APPLICATIONS

This application claims priority to PCT Application No. PCT/EP2008/011042, filed Dec. 22, 2008; which claims priority to German Patent Application No. DE 10 2007 061 590.8, filed Dec. 20, 2007, and claims the benefit to U.S. Provisional Patent Application No. 61/015,217, filed Dec. 20, 2007, the entire disclosures of which applications are hereby incorporated by reference.

BACKGROUND

The invention relates to a high-lift system for an aircraft with a main wing and a slat that, by means of an adjustment device, can be adjusted relative to said main wing to various adjustment states, with said high-lift system comprising a device for influencing the airflow. By means of the device for influencing the airflow, in particular a reduction in the aerodynamic noise on slats of aircraft is achieved.

Documents U.S. Pat. No. 3,363,859, EP 0230684A and DE746714C disclose a high-lift system for an aircraft with a main wing and a slat that by means of an adjustment device is adjustable relative to said main wing to various adjustment states, with a gap resulting between the rear of the slat, wherein at the rear of the slat an air outlet is formed.

In order to be able to generate sufficient lift force during takeoff and landing, the aerofoils of modern aircraft mostly comprise variable high-lift devices (slats and flaps) whose extension results in the adjustment of a base geometry, which is optimised to cruising, to low flight speeds. In the extended state there is a gap between the slat and the main wing, through which gap the air is accelerated and moves with considerable sound emission from the pressure side of the wing to its suction side. Presently the flow around the lift-generating surfaces is a significant contributor to noise generation of aircraft in the landing approach.

The airflow around the slat creates a recirculation region which on the one hand is bordered by the slat pressure side in the form of a channel, and on the other hand is separated from the fast gap airflow by a free shear layer. Instabilities in this free shear layer result in the formation of discrete vortex structures which are then conveyed continuously along a (an imaginary) separation flow line in the direction of a second stagnation point on the underside of the slat. At this position the airflow splits, and the vortex structures partly enter the recirculation region, and partly exit, greatly accelerated, through the gap between the slat and the main wing. The accelerated movement of the vortices and in particular their exit from the gap result in the emission of sound waves, wherein the sudden impedance jump between the solid wall and the free airflow when flowing over the trailing edge of the slat results in generating acoustic fluctuations as a result of hydrodynamic pressure fluctuations. If the trailing edge of the slat is obtuse, the interaction of the emanating vortices with a vortex path that results further downstream should be mentioned as an additional source of noise.

Measures relating to noise reduction can be aimed at adjusting the geometry of the slat to the shape of the recirculation region (displacement body, separating surface, bellows). Likewise, devices for influencing the free shear layers (rows of broom fibre) or for attenuating sound propagation (acoustic absorber surfaces) can be provided.

One option relating to the aerodynamic noise reduction of slats of a commercial aircraft is known from DE 100 19 185 A1. In this arrangement the rear profile surface of the slat, the shape of which profile surface matches the exterior contour of the main wing, comprises a hollow displacement body (bellows) that can be inflated by means of compressed air from at least one bleed air line. If the bellows is pressurised while the slat is extended, the bellows expands and the size of the adjoining recirculation region decreases. With a suitable shape in the inflated state, noise-emitting vortex formation at the extended slat is thus reduced.

DE 199 25 560 A1 describes the incorporation of a rigid or flexible separating surface attached to the additional wing, which separating surface is arranged along the separation flow line that extends between the return flow region and the gap flow, and extends in the direction of the main wing, as a result of which arrangement the pulse exchange transversely to the direction of the gap flow can be impeded, and consequently the sound-source level of slats can be reduced.

A similar method for reducing the aerodynamic noise on an additional aerofoil of an aircraft is described in DE 10 2004 056 537 A1. The arrangement comprises an n-stable separating surface that by means of an actuator device, when the additional aerofoil is in the extended state, can be displaced to the gap and in that location entirely or partially extends along the separation flow line situated between the recirculation region and the gap flow, as a result of which displacement the vortex formation and ultimately the sound radiation can be significantly reduced.

From DE 101 57 849 A1 a further arrangement for reducing the aerodynamic noise on a slat of a commercial aircraft is known, which arrangement reduces the energy exchange by way of the shear layers that arise on the extended slat with the use of several broom fibres arranged in series along the slat edges. The final flowthrough resistance of these rows of broom fibre that form a separating surface results in a more gentle equalisation of the turbulent alternating pressures in the direction of the airflow, and ultimately results in weakening of the noise source mechanisms active in the shear layers.

U.S. Pat. No. 6,454,219 describes an arrangement in which with the use of sound-absorbent materials on the slat and/or on the main wing the sound waves are attenuated while still in the gap region, as a result of which the outwards-radiated acoustic energy is reduced.

In arrangements which for the purpose of noise reduction provide for the positioning of rigid structures in the gap between the slat and the main wing (e.g. a rigid separating surface) there is generally a danger that in the case of a defect in the kinematic actuator mechanism required for retraction the articulation of the slat to the main wing is prevented so that the aircraft needs to remain in its high-lift configuration.

The use of additional mounting parts is associated with a disadvantage in that it basically results in increased maintenance expenditure. This will be necessary in particular in the case of elastic or movable subassemblies in order to prevent possible destruction as a result of aging or fatigue of the material used, wherein fatigue can be caused either by fluctuating aerodynamic loads or by design-related alternating loads.

In the case of components aimed at matching the slat contour to the shape of the recirculation region, undesirable aerodynamic effects can occur as a result of sudden changes in the flow conditions (e.g. angle of attack) unless immediate matching of the contour to the changed boundary conditions takes place.

Arrangements that aim to attenuate propagation of noise cannot reduce sound radiation to the extent theoretically possible by favourably influencing of the sound mechanism.

SUMMARY OF THE INVENTION

It is the object of the invention to create on a high-lift system a measure for reducing the flow noise, which method is simple in design, safe in operation and flexible with a view to changing flow conditions, while the influence of said measure on the air forces on the wing is modest.

This object is met by the characteristics of one or more embodiments disclosed and described herein.

The invention provides for a high-lift system for an aircraft with a main wing and a slat that by means of an adjustment device is adjustable relative to said main wing to various adjustment states, with a gap resulting between the rear of said slat, which rear faces the main wing, and the main wing, wherein the size of said gap results from the adjustment state of the slat relative to the main wing. In the interior of the slat an air guidance channel with at least one inlet and an air guidance channel outlet is formed, wherein the inlet is arranged at the rear, which faces the main wing, in order to influence the airflow in the gap.

In this arrangement it can be provided for the mass flow to be able to be adjusted at the inlet, at the rear side, which faces the main wing, by means of a flowthrough adjustment device, in order to influence the airflow in the gap. The flowthrough adjustment device can, in particular, comprise a closure device which due to the pressure present at the rear can open and close. To this effect the flowthrough adjustment device can comprise an aperture part, arranged on the inlet, which aperture part is pre-tensioned to the closed position of the inlet and is set in such a manner that at a predetermined first pressure occurring at the rear the aperture part moves to an open position, while at a predetermined second pressure occurring at the rear it moves into the closed position.

As an alternative or in addition it can be provided for the flowthrough adjustment device to be actively controlled.

Generally speaking, the flowthrough adjustment device can be arranged within the air guidance channel and/or at the inlets and/or at the air guidance channel outlets.

The inlet can comprise several inlet apertures. Furthermore, the inlet apertures can be arranged in a row along the span direction of the slat. Moreover, the inlet apertures can be arranged in several rows along the span direction of the slat. The at least one inlet aperture can, in particular, be a circular aperture. In particular, the at least one inlet aperture can be an elongated aperture.

Furthermore, at the rear of the slat in addition a section can comprise an absorber material. The absorber material can be an absorber material layer integrated in the rear, in which layer at least one inlet is integrated.

At its rear facing the main wing the slat can comprise a region with concave curvature when viewed from the main wing, in which region the at least one inlet is arranged. At the position between the front and the rear, in the lower region of the slat said slat can comprise an edge that extends in the span direction of the slat.

The outlet can be an individual outlet or it can comprise several outlet apertures. The outlet of the air guidance channel can lead to the outer surroundings of the slat, and can be arranged on one or both ends, situated in the span direction, of the slat. As an alternative or in addition, the outlet can lead from the air guidance channel to the outer surroundings of the slat, and can be arranged on the trailing edge. Furthermore, as an alternative or in addition, the outlet can lead from the air guidance channel to the outer surroundings of the slat, and can be arranged on the edge that is situated on the underside of the slat.

Furthermore, it can be provided for a connecting channel to be coupled to the air guidance channel, which connecting channel leads from the air guidance channel to the interior of the main wing.

In order to adjust the flowthrough adjustment device between an open and a closed state it can be provided for the flowthrough adjustment device to be functionally coupled to a control device that comprises a control function to generate control signals or control commands for controlling the flowthrough adjustment device.

In this arrangement the control device can comprise an input device by means of which the control device can receive sensor data and/or system data, and it can be provided that the control function determines the control commands for opening and closing the flowthrough adjustment device depending on the adjustment state of the slat.

In particular, the control device can comprise an input device by means of which the control device can receive sensor data and/or system data, and in this arrangement it can be provided for the control function to determine the control commands for opening and closing the flowthrough adjustment device depending on sensor data and/or system data.

The control device can be integrated in the slat.

The input device of the control device can be designed for receiving data from the flight control system of the aircraft, and in this arrangement it can, in particular, be provided for the control function to determine the control commands for opening and closing the inlet depending on data from the flight control system.

In this arrangement the data received from the flight control system of the aircraft can comprise the adjustment position of the slat, wherein the control function determines the control commands for opening and closing the flowthrough adjustment device depending on the adjustment position of the slat.

Furthermore, it can be provided for the control function to determine the positioning commands for the flowthrough adjustment device depending on air data that has been transmitted by the flight control system. In this arrangement the air data can describe the angle of attack of the aircraft, and/or the speed and/or the flight position of the aircraft.

The control device of the flowthrough adjustment device can comprise a comparison function which compares transmitted air data and/or the adjustment position of the slat with a first setpoint value and with a second setpoint value, wherein when in some regions the first setpoint value has been attained the control function transmits to the flowthrough adjustment device control commands for opening the flowthrough adjustment device, and when in some regions the second setpoint value has been attained the control function transmits to the flowthrough adjustment device actuating commands for closing the flowthrough adjustment device.

The control device can be integrated in a computer, which is situated in the aircraft fuselage, of the flight control system, and the control commands can be transmitted to the flowthrough adjustment device by way of a command line.

Furthermore, the high-lift system can comprise at least one pressure sensor, which is arranged at the rear of the slat, for measuring the static pressure of the airstream and is functionally connected to the input device for transmitting a measured pressure to the control function, wherein the control function is designed in such a manner that it determines control signals for the flowthrough adjustment device depending on the measured pressure.

The flowthrough adjustment device can, in particular, be implemented by a valve or by several valves, which is/are provided within the air guidance channel for regulating the flowthrough in said air guidance channel.

Furthermore, at least one airflow drive can be arranged in the air guidance channel, which airflow drive influences the air mass flow between the inlet and the outlet.

Furthermore, it can be provided for the flowthrough adjustment device to be activated by at least one piezoactuator by means of which in particular the inlet or several or all the inlets and/or the outlet or several or all the outlets can be opened and closed. The at least one piezoactuator can be functionally connected, by means of a control device, to the at least one pressure sensor at the rear of the slat for the purpose of measuring the static pressure of the airstream in order to adjust the flowthrough adjustment device.

The pressure sensor can be arranged on the inlet and/or on the outlet.

The control device can, in particular, comprise a comparison function by means of which the pressure on the at least one inlet and on the at least one outlet is compared, and based on which comparison function positioning signals for the flowthrough adjustment device are determined depending on the determined pressure differential.

The control device can be integrated with a central computer of the high-lift system that commands adjustment of the high-lift flaps.

Furthermore, the control device can comprise a table with an allocation of predetermined operational data with desired adjustment positions of the flowthrough adjustment device, as well as a comparison function by means of which measured operational data is compared with the operational data stored in the comparison table, and, if there is agreement in some regions, the respectively associated desired adjustment position is transmitted to the inlet adjustment device.

According to the invention an aircraft with a high-lift system according to one of the above-mentioned embodiments is provided. In this arrangement it can also be provided for the connecting channel that is connected to the air guidance channel to lead into the fuselage.

The invention does not comprise any external mounting parts on the slat. Additional movable elements are limited to subassemblies that are connected to the control system of the suction-removal mass flow (e.g. valves).

If the pressure differential necessary for suction removal can be generated by an air-guiding connection between the void in the slat and a negative pressure region on the aircraft, the construction expenditure and the additional weight are comparatively small.

For a hollow slat, implementation of the noise reduction measure is also imaginable as a retrofit measure.

The arrangement is insensitive to any sudden change in flow conditions (e.g. change in the angle of attack).

If suction removal were to fail to occur, apart from an increase in the noise emission no negative effect is to be expected as a result. In particular, as a result of there not being any exterior mounting parts the slat always remains retractable.

BRIEF DESCRIPTION OF THE DRAWINGS

Exemplary embodiments of the invention are described with reference to the enclosed figures which show the following.

DETAILED DESCRIPTION OF THE INVENTION

Figure 1:
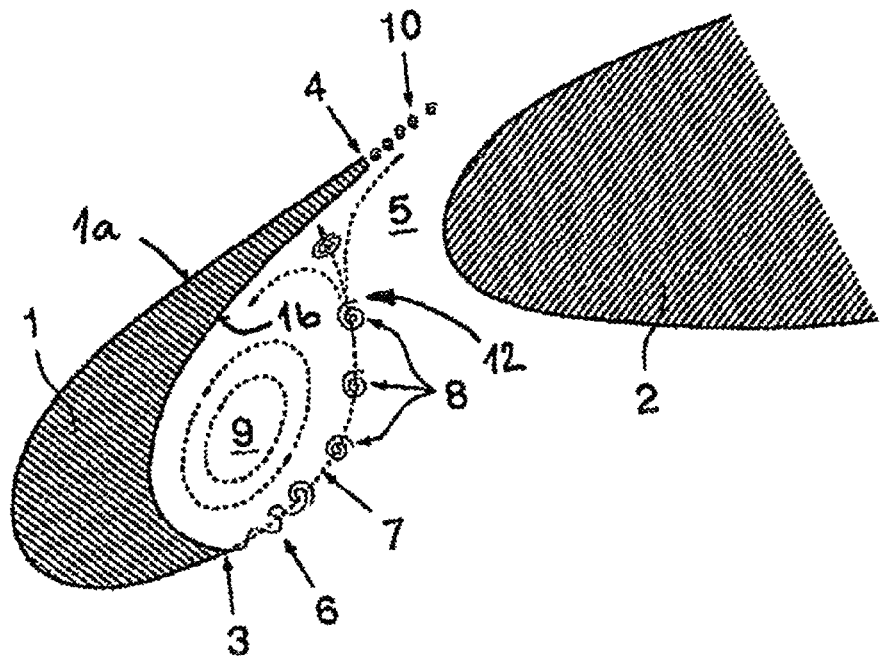
FIG. 1 a lateral cross-section view of part of a main wing and a slat, in its extended state, situated in front of said main wing, with the airflow between the slat and the main wing being shown in the absence of a device according to the invention for influencing the airflow.

According to the invention a high-lift system for an aircraft with a main wing and a slat that by means of an adjustment device is adjustable relative to the main wing to various adjustment states is provided. The slat comprises a rear 1b that faces the main wing. Between the rear 1b and the main wing 2 there is a gap 5, whose size results from the adjustment state of the slat 1 relative to the main wing 2 and consequently in particular as a result of the distance between the slat 1 and the main wing 2. In the interior of the slat there is an air guidance channel 11 with at least one inlet 20 and an outlet. In this arrangement the inlet 20 is arranged at the rear 1b that faces the main wing so as to influence the airflow in the gap 5.

The void 11 in the slat 1 can be continuous or can be divided into several separate individual chambers, e.g. in order to make possible local adaptation of the suction-removal mass flow, controlled by way of different pressure conditions in the individual chambers.

For this purpose the slat 1 can, in particular, comprise a void that is used as an air guidance channel 11. The inlet 20 at the rear 1b that faces the main wing 2 is in a suitable manner subjected to negative pressure relative to the pressure in the recirculation region 9 so as to generate a continuous suction-removal mass flow through the perforation. In this arrangement the sucked-in air is removed from the void by way of at least one outlet (shown schematically as element 30a and/or 30b).

For this purpose the slat 1 can, in particular, comprise a void that is used as an air guidance channel 11. The inlet 20 at the rear 1b that faces the main wing 2 is in a suitable manner subjected to negative pressure relative to the pressure in the recirculation region 9 so as to generate a continuous suction-removal mass flow through the perforation. In this arrangement the sucked-in air is removed from the void by way of at least one air line (not shown).

According to the invention it can, in particular, be provided for the mass flow that is removed by suction at the rear 1b that faces the main wing 2 to be able to be adjusted by means of a flowthrough adjustment device 50 in order to influence the airflow in the gap 5. The mass flow which flows through the air guidance channel 11 results from the airflow conditions at the at least one inlet 20 and at the at least one outlet 30a, 30b, if applicable depending on their opening states and if applicable as a result of an airflow drive 52 that is effective in the air guidance channel 11, or as a result of several airflow drives 52 that are effective in the air guidance channel 11.

To this effect the flowthrough adjustment device 50 can comprise a closure device 54 which due to the pressure present at the rear 1b can open and close independently, i.e. without active operation. The flowthrough adjustment device 50 can be arranged on at least one inlet 20, on at least one outlet 30a, 30b and/or within the air guidance channel 11.

To this effect the flowthrough adjustment device 50 can comprise an aperture part 56, arranged on the inlet 20, which aperture part is pre-tensioned towards the closed position of the inlet 20 and is set in such a manner that at a predetermined first pressure occurring at the rear 1b the aperture part 56 moves to an open position, while at a predetermined second pressure occurring at the rear 1*b* it moves to the closed position.

Furthermore, the flowthrough adjustment device can be actively controlled. To this effect, in particular, a flowthrough adjustment device can be arranged within the air guidance channel 11 and/or on the inlets.

In order to explain the mode of action of the arrangement in detail, firstly the sound generating mechanism during flow around the uninfluenced base configuration is discussed with reference to FIG. 1. As a rule, the (in)side of the slat 1, which side faces the main wing 2, is of concave shape so that during cruising it can be hinged to the nose contour of the main wing. At the transition from the convex outside to the concave inside a kink arises in the contour 3, which the fast flow around the slat cannot follow. The airflow detaches at this edge and a free shear layer 6 arises which due to disturbances and instabilities rolls into discrete vortex structures 8. The vortices that arise continuously in this manner are conveyed with the flow along a (an imaginary) separation flow line 7 until they are located near the point of renewed application on the underside of the slat. At this point the airflow splits, wherein in this document for the sake of simplicity only the airflow in one plane is discussed, while any possibly occurring transverse airflow in the direction of the span is ignored. During their approach to the stagnation point the vortices are subjected to shear forces of the middle airstream and are longitudinally deformed. In this arrangement part of the inflowing vortices 8 enters the turbulent recirculation region 9 shortly before reaching the stagnation point, with the continuous rotary movement of said recirculation region 9 being permanently maintained as a result of the fast gap flow. The turbulence within the recirculation zone again has a destabilising effect on the free shear layer and stimulates its decay into discrete vortex structures. The remaining part of the vortices that approach the point of renewed application is conveyed through the gap 5 between the slat and the main wing, and in this process is accelerated considerably, before finally, while interacting with the trailing edge 4 of the slat and with an alternating vortex path 10 that under circumstances arises in that location, exiting from said slat.

There are various causes for the considerable noise generation at the slat. As is known, one source mechanism is due to the pressure fluctuations on the profile surfaces (surface sources) caused by non-stationary vortex movement near the wall. Moreover, considerable acceleration of the vortices during conveyance through the gap directly results in noise emission (volume sources). The sudden impedance jump during the outflow of the vortices over the trailing edge of the slat (edge noise) is a further significant source of noise. Especially due to its interaction with vortices emanating from the gap, any vortex path arising downstream of this position represents a further source of noise. Further downstream, vortices ejected through the gap can enter the boundary layer on the main profile and in that location can generate additional surface sound.

In order to explain the sound-reducing effect of the arrangement presented, a comparison of the flow topology that has been changed between the base configuration (FIG. 1) and the modified variant (FIG. 2) is recommended. In both cases a free shear layer 6 will form between the recirculation region 9 and the fast gap flow, from which shear layer 6 as a result of disturbances and instabilities discrete vortex structures 8 finally form. Since the boundary layer thickness on the inside of the slat decreases as a result of removal by suction, it must be assumed that in the influenced case the free shear layer will be thinner. As a result of suction removal, turbulent air is removed from the recirculation region 9, so that the initial development of the free shear layer 6 is disturbed by fewer instabilities than it is in the non-influenced case. The combination of these effects can result in the formation of smaller vortex structures and their somewhat delayed formation when compared to the base configuration. As indicated in FIG. 1 by the branching of the separation flow line 7 near the point of renewed application on the inside of the slat, the turbulent airflow splits at this point, wherein in particular the vortices that do not enter the recirculation region 9 but instead are accelerated through the gap 5 and flow out over the trailing edge of the slat cause strong sound emission.

Figure 2:
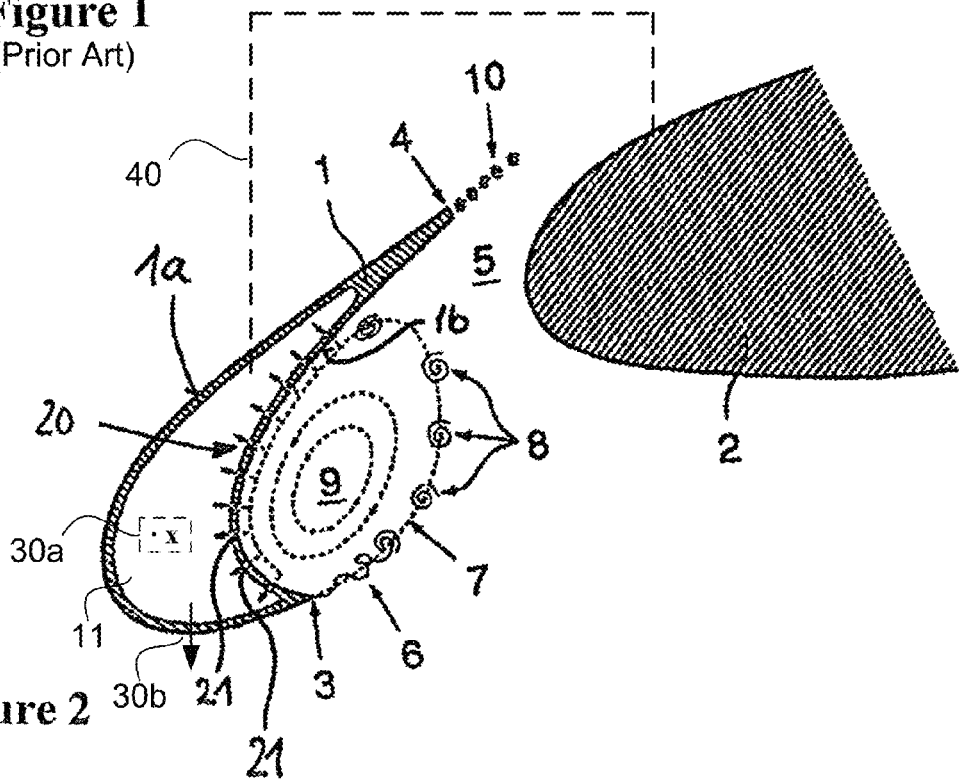
FIG. 2 part of a main wing and a slat in the position shown in FIG. 1, with the airflow between the slat and the main wing being shown when the device according to the invention for influencing the airflow is present and activated.
Figure 3:
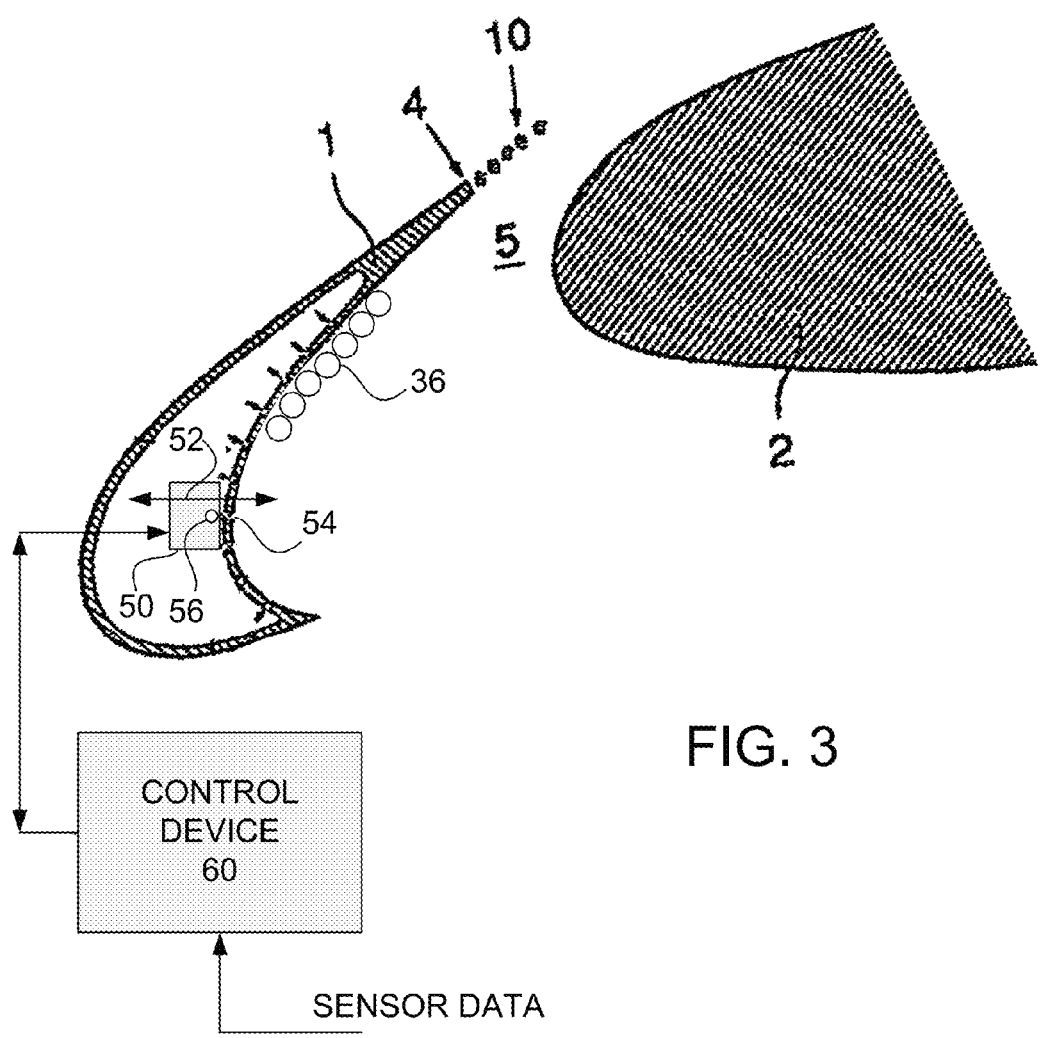
FIG. 3 is a view of further structure and functionality of the wing and slat combination of FIG. 2.

This undesirable effect due to the emanation of vortices from the gap 5 can be partly or fully avoided by means of the arrangement shown in FIG. 2. For reasons relating to continuity the quantity of air removed by suction from the recirculation region 9 must be supplied by the flow. Since the airflow detaches in a geometry-induced manner at the lower slat edge 3, the air can only flow to the recirculation region by way of a displacement of the separation flow line 7, if one excludes compensating border effects at the span ends of the slat. The displacement of the separation flow line, which displacement occurs as a result of suction removal, results in increased conveyance of vortices from the free shear layer 8 in the direction of the suction removal slits, and consequently at the same time the ejection of vortices through the gap 5 is reduced, and thus noise emission is reduced. In this arrangement the splitting of the vortex structures at the branch point can be controlled by way of the suction removal mass flow. Since the thickness of the turbulent shear layer 7 is small when compared to the gap 5 through which air flows quickly, even at a low ratio of suction-removal mass flow to gap mass flow, i.e. without a significant change in the aerodynamic effect, a noise-reducing effect can be achieved. In the case of larger suction-removal mass flows complete deflection of all the shear layer vortices to the recirculation region is imaginable; however, limitation of the suction-removal mass flow seems sensible only in order to limit the aerodynamic influence of the arrangement.

The inlet 20 of a slat can comprise one inlet aperture or several inlet apertures. The inlet apertures can be arranged in a row along the span direction of the slat. Furthermore, the inlet apertures can be arranged in several rows along the span direction of the slat.

Moreover, the at least one inlet aperture can be a circular aperture 21. The at least one inlet aperture can be an elongated aperture.

According to a further embodiment of the invention, at the rear 1*b* of the slat 1 in addition a section comprising an absorber material 36 can be provided.

If in this arrangement an air-permeable, possibly a porous, material is used, it is further imaginable to improve the noise-reducing effect of the arrangement as a result of the combination comprising suction removal and a permeable, locally-reacting absorber surface. In this way it would be possible to favourably influence both noise generation and noise propagation in the context of noise reduction.

The slat can be designed in various ways and in particular also in the context of the arrangement of the inlet and/or of the outlet. In this arrangement the rear 1*b* of the slat, which rear 1*b* faces the main wing, can comprise a region 4 with concave curvature when viewed from the main wing, in which region 4 the at least one inlet 20 is arranged. Furthermore, at the position between the front 1*a* and the rear 1*b* the slat 1 at its lower region can comprise an edge 3 that extends in the span direction of the slat 1.

The outlet 30a, 30b can comprise several outlet apertures. In particular, the outlet 30a can lead from the outer surroundings of the slat 1 and in this arrangement can be arranged on one end or on both ends, situated in span direction, of the slat 1 (as illustrated schematically by the "." and "x", which indicate respective directions of airflow). As an alternative or in addition, the outlet can lead from the air guidance channel to the outer surroundings of the slat 1 and can be arranged on the trailing edge 4.

The outlet 30b can lead from the air guidance channel 11 to the outer surroundings of the slat 1 and can be arranged on the edge that is situated on the underside of the slat 1.

Moreover, a connecting channel (schematically illustrated as element 40) can be coupled to the air guidance channel 11, which connecting channel leads from the air guidance channel 11 to the interior of the main wing 2.

According to a further exemplary embodiment of the invention, the flowthrough adjustment device 50 can be functionally coupled to a control device 60 that comprises a control function to generate positioning signals or positioning commands for controlling the flowthrough adjustment device, 50 by means of which positioning signals or positioning commands the flowthrough adjustment device 50 can be adjusted between an open and a closed state. The control device 60 can comprise an input device by means of which the control device 60 can receive sensor data and/or system data. In particular, the control function can determine the control commands for opening and closing the flowthrough adjustment device 50 depending on the adjustment state of the slat 1.

Furthermore, the control device can comprise an input device by means of which the control device can receive sensor data and/or system data, and it can be provided for the control function to determine the positioning commands for opening and closing the flowthrough adjustment device depending on sensor data and/or system data.

The control device can be integrated in the slat 1.

The input device of the control device can be equipped to receive data from the flight control system of the aircraft. Furthermore, the control function can be functionally designed in such a manner that it determines positioning commands for opening and closing the flowthrough adjustment device depending on data from the flight control system.

In this arrangement the data received by the flight control system of the aircraft can comprise, in particular, the adjustment position of the slat, and the control function can furthermore be functionally designed in such a manner that it determines positioning commands for opening and closing the flowthrough adjustment device depending on the adjustment position of the slat.

Furthermore, it can be provided for the control function to determine the positioning commands for the flowthrough adjustment device depending on air data that has been transmitted by the flight control system. In this arrangement the air data can describe the angle of attack of the aircraft, and/or the speed and/or the flight position of the aircraft.

Furthermore, it can be provided for the control device of the flowthrough adjustment device to comprise a comparison function which compares the transmitted air data and/or the adjustment position of the slat with a first setpoint value and with a second setpoint value, wherein when in some regions the first setpoint value has been attained the control function transmits to the flowthrough adjustment device control commands for opening the flowthrough adjustment device, and when in some regions the second setpoint value has been attained the control function transmits to the flowthrough adjustment device control commands for closing the flowthrough adjustment device.

The control device can be integrated in a computer, which is situated in the aircraft fuselage, of the flight control system, wherein the positioning commands are transmitted to the flowthrough adjustment device by way of a command line.

The high-lift system can comprise at least one pressure sensor that is arranged at the rear 1a of the slat 1 for the purpose of measuring the static pressure of the airflow. The pressure sensor can be functionally connected to the input device for the purpose of transmitting a measured pressure to the control function, and the control function can be designed in such a way that it determines positioning signals for the flowthrough adjustment device depending on the measured pressure.

In an embodiment of the invention the flowthrough adjustment device can be implemented by means of one valve or several valves provided within the air guidance channel 11 for regulating the flow through said air guidance channel 11. The valve or valves can be functionally connected to the control device according to described alternatives in order to actively adjust the valve or valves. As an alternative or in addition, adjustment of the valve or the valves can take place in the described manner passively, and in particular on the basis of the pressure present at the rear 1b. The additional provision of passive adjustment can be advantageous in particular to provide a safety function in the context of fail-safe operation.

In the above-mentioned embodiments of the invention the air mass flow in the air guidance channel 11 can be generated by means of at least one air flow drive which influences, i.e. generates or supports, the air mass flow between the inlet and the outlet. The at least one airflow drive can be arranged within the air guidance channel 11 between the inlet and the outlet. The air flow drive can be a pump or a propeller. In this arrangement the drive device for the flow drive can be arranged outside the air guidance channel 11.

According to the invention, the flowthrough adjustment device can also be operated by means of at least one piezoactuator.

In this arrangement the at least one piezoactuator can be structurally integrated in the closing device or opening device for opening or closing the inlet. Furthermore, the flowthrough adjustment device can comprise one or several piezoactuators arranged on a surface, or on two opposite surfaces extending in longitudinal direction of the flowthrough adjustment device. In this arrangement the flowthrough adjustment device is designed so as to be flexible so that correspondingly affixed piezoactuators, designed for contraction and elongation of the positioning modi, can vary the shape and in particular the curvature of the flowthrough adjustment device when viewed in longitudinal direction of said flowthrough adjustment device.

The piezoactuators can, for example, be designed in the form of piezoceramic foils, thin plates, wafers or fibres, including piezoceramic fibres with an interdigital electrode. Several plate-shaped piezoactuators can also be arranged so as to form several discrete layers, one on top of the other, and can be fabricated to form a flat, plate-shaped actuator package (as a multilayer structure or in a bimorphous design).

In this arrangement the at least one piezoactuator can be actively controlled by way of a control device according to the invention, or the piezoactuators can be implemented with the use of a passive circuit and can carry out a change in the shape of the flowthrough adjustment device based on a movement of said flowthrough adjustment device, i.e. they can amplify and/or continue an initial movement that can take place automatically in the described manner, based on occurring pressure differentials. The passive circuit can be designed without a control device or with a control device, e.g. as a safety function. In this arrangement the piezoactuators and the circuit that couples them are designed in such a way that said piezoactuators when they are elongated, due to an initial movement in the retraction direction or the extension direction of the flowthrough adjustment device transmit control signals to at least some of the piezoactuators in order to operate the aforesaid in the sense of continuing the initially acquired adjustment of the flowthrough adjustment device. The piezoactuators can also comprise a positioning path enlargement element, e.g. a corresponding bar that correspondingly transforms the excursion of the piezoactuators.

In particular, it can be provided for the piezoactuator to be functionally connected, by way of a control device, to the at least one pressure sensor at the rear 1a of the slat 1 for measuring the static pressure of the airstream in order to adjust the flowthrough adjustment device.

The at least one pressure sensor can be arranged on the inlet and/or on the outlet.

Furthermore, the control device can comprise a comparison function by means of which the pressure at the at least one inlet and at the at least one outlet is compared, and on the basis of which comparison function positioning signals for the flowthrough adjustment device are determined depending on the determined pressure differential.

The control device can be integrated with a central computer of the high-lift system that commands adjustment of the high-lift flaps.

The control device can comprise a table with an allocation of predetermined operational data with desired adjustment positions of the inlet adjustment device, as well as a comparison function by means of which measured operational data is compared with the operational data stored in the comparison table, and, if there is agreement in some regions, transfers the respectively associated desired adjustment position to the inlet adjustment device.

REFERENCE CHARACTERS

1 Slat
1a Front of the slat
1b Rear of the slat
2 Main wing
3 Bottom edge (of the slat 1)
4 Trailing edge (of the slat 1)
5 Gap
6 Free shear layer
7 Separation flow line
8 Vortex structures
9 Recirculation region
10 Vortex path
11 Void (of the slat 1).
20 Air guidance channel inlet

The invention claimed is:

1. A high-lift system for an aircraft, comprising:
a main wing; and
a slat that is adjustable relative to said main wing to various adjustment states by means of an adjustment device, resulting in a gap between a rear surface of the slat and a forward surface of the main wing, where the rear surface of the slat faces the forward surface of the main wing, and a size of the gap results from the adjustment state of the slat relative to the main wing, wherein:
an interior of the slat includes an air guidance channel with at least one air guidance channel inlet and at least one air guidance channel outlet, and
the air guidance channel inlet is arranged at a rear portion of the slat, which faces the main wing, so that air external to the aircraft flows from the gap through the air guidance channel inlet into the air guidance channel.

2. The high-lift system according to claim 1, wherein an air mass flow is adjustable at the air guidance channel inlet, by means of a flowthrough adjustment device in order to influence the airflow in the gap.

3. The high-lift system according to claim 2, wherein the flowthrough adjustment device comprises a closure device which, due to the pressure present at the rear of the slat, operates to open and close.

4. The high-lift system according to claim 2, wherein the flowthrough adjustment device comprises an aperture part, arranged on the air guidance channel inlet, which aperture part is pre-tensioned to a closed position of the air guidance channel inlet and is set in such a manner that, at a predetermined first pressure occurring at the rear of the slat, the aperture part moves to an open position, while at a predetermined second pressure occurring at the rear of the slat, the aperture part moves to the closed position.

5. The high-lift system according to claim 2, wherein the flowthrough adjustment device is actively controlled.

6. The high-lift system according to claim 5, wherein the flowthrough adjustment device is functionally coupled to a control device that comprises a control function to generate positioning signals or positioning commands for controlling the flowthrough adjustment device, by means of which control signals or control commands the flowthrough adjustment device is adjustable between an open state and a closed state.

7. The high-lift system according claim 6, wherein:
the control device comprises an input device, by means of which, the control device receives at least one of sensor data and system data, and
the control function determines the control commands for opening and closing the flowthrough adjustment device depending on the adjustment state of the slat.

8. The high-lift system according to claim 6, wherein:
the control device comprises an input device, by means of which the control device can receive at least one of sensor data and system data, and
the control function determines the control commands for opening and closing the air guidance channel inlet depending on one or more of the sensor data and system data.

9. The high-lift system according to claim 8, wherein the control device is integrated in the slat.

10. The high-lift system according claim 8, wherein:
the input device of the control device is equipped for receiving data from a flight control system of the aircraft, and
the control function determines the control commands for opening and closing the inlet depending on data from the flight control system.

11. The high-lift system according to claim 6, wherein:
data received from a flight control system of the aircraft comprises the adjustment position of the slat, and
the control function determines the control commands for opening and closing the flowthrough adjustment device depending on the adjustment position of the slat.

12. The high-lift system according to claim 6, wherein the control function determines the control commands for the flowthrough adjustment device depending on air data that has been transmitted by a flight control system of the aircraft.

13. The high-lift system according to claim 12, wherein the air data describes at least one of: an angle of attack of the aircraft, a speed, and a flight position of the aircraft.

14. The high-lift system according to claim 6, wherein:
the control device of the flowthrough adjustment device comprises a comparison function which compares at least one of: transmitted air data, and the adjustment position of the slat, with a first setpoint value and with a second setpoint value,
when in some regions the first setpoint value has been attained the control function transmits to the flowthrough adjustment device control commands for opening the flowthrough adjustment device, and
when in some regions the second setpoint value has been attained the control function transmits to the flowthrough adjustment device control commands for closing the flowthrough adjustment device.

15. The high-lift system according to claim 6, wherein the control device is integrated with a computer, which is situated in an aircraft fuselage, and the control commands are transmitted to the flowthrough adjustment device by way of a command line.

16. The high-lift system according to claim 6, wherein:
the high-lift system comprises at least one pressure sensor, which is arranged at the rear of the slat for measuring static pressure of an airstream and is functionally connected to the input device for transmitting a measured pressure to the control function, and
the control function operate to determine control signals for the flowthrough adjustment device depending on the measured pressure.

17. The high-lift system according to claim 16, wherein the pressure sensor is arranged on at least one of: the inlet, and the air guidance channel outlet.

18. The high-lift system according to claim 17, wherein the control device comprises a comparison function, by means of which the pressure on the at least one inlet and on the at least one air guidance channel outlet is compared, and based on which comparison function control signals for the flowthrough adjustment device are determined depending on the determined pressure differential.

19. The high-lift system according to claim 6, wherein the flowthrough adjustment device is implemented by one or more valves, which are provided within the air guidance channel for regulating the flowthrough in said air guidance channel.

20. The high-lift system according to claim 6, wherein at least one airflow drive is arranged in the air guidance channel, which airflow drive influences air mass flow between the inlet and the air guidance channel outlet.

21. The high-lift system according to claim 6, wherein the control device is integrated with a central computer of the high-lift system, which commands adjustment of the slat.

22. The high-lift system according to claim 6, wherein the control device comprises a table with an allocation of predetermined operational data with desired adjustment positions of the flowthrough adjustment device, as well as a comparison function by means of which measured operational data is compared with the operational data stored in the comparison table, and, if there is agreement in some regions, the respectively associated desired adjustment position is transmitted to the inlet adjustment device.

23. The high-lift system according to claim 2, wherein the flowthrough adjustment device is arranged at least one of: within the air guidance channel, at the inlets, and at the air guidance channel outlets.

24. The high-lift system according to claim 1, wherein the air guidance channel inlet comprises several inlet apertures.

25. The high-lift system according to claim 1, further comprising an absorber material located at a section at the rear of the slat.

26. The high-lift system according to claim 25, wherein the absorber material is an absorber material layer integrated in the rear of the slat, in which absorber material layer at least one inlet is integrated.

27. The high-lift system according to claim 1, wherein at the rear of the slat facing the main wing, the slat comprises a region with concave curvature when viewed from the main wing, in which region the at least one air guidance channel inlet is arranged.

28. The high-lift system according to claim 1, wherein at a position between front of the slat and the rear of the slat, in a lower region of the slat, the slat includes an edge that extends in a span direction of the slat.

29. The high-lift system according to claim 1, wherein the air guidance channel outlet of the air guidance channel leads to outer surroundings of the slat, and is arranged on one or both ends, situated in a span direction of the slat.

30. The high-lift system according to claim 1, wherein the air guidance channel outlet leads to the outer surroundings of the slat and is arranged on a trailing edge thereof.

31. The high-lift system according to claim 1, wherein the air guidance channel outlet of the air guidance channel leads to outer surroundings of the slat and is arranged on an edge that is situated on an underside of the slat.

32. The high-lift system according to claim 1, wherein a connecting channel is coupled to the air guidance channel, which connecting channel leads from the air guidance channel to an interior of the main wing.

33. The high-lift system according to claim 2, wherein the flowthrough adjustment device is activated by at least one piezoactuator.

34. The high-lift system according to claim 33, wherein the at least one piezoactuator is functionally connected, by means of a control device, to at least one pressure sensor at the rear of the slat for the purpose of measuring static pressure of an airstream in order to adjust the flowthrough adjustment device.

35. An aircraft, comprising:
a high-lift system including a main wing; and a slat that is adjustable relative to said main wing to various adjustment states by means of an adjustment device, resulting in a gap between a rear surface of the slat and a forward surface of the main wing, where the rear surface of the slat faces the forward surface of the main wing, and a size of the gap results from the adjustment state of the slat relative to the main wing, wherein:
an interior of the slat includes an air guidance channel with at least one air guidance channel inlet and at least one air guidance channel outlet, and
the air guidance channel inlet is arranged at a rear portion of the slat, which faces the main wing, so that air external to the aircraft flows from the gap through the air guidance channel inlet into the air guidance channel.

* * * * *